Nov. 10, 1936.  L. W. BAHNEY  2,060,137
PROCESS OF REFINING METALS
Filed Oct. 26, 1934  2 Sheets-Sheet 1

INVENTOR
Luther W. Bahney
BY
Emery, Booth, Varney & Whittemore
ATTORNEYS

Nov. 10, 1936.  L. W. BAHNEY  2,060,137
PROCESS OF REFINING METALS
Filed Oct. 26, 1934  2 Sheets—Sheet 2

INVENTOR
Luther W. Bahney
BY
Emery, Booth, Varney & Whittemore
ATTORNEYS

Patented Nov. 10, 1936

2,060,137

UNITED STATES PATENT OFFICE 2,060,137

PROCESS OF REFINING METALS

Luther W. Bahney, Elizabeth, N. J., assignor, by mesne assignments, to Scovill Manufacturing Company, Waterbury, Conn., a corporation of Connecticut Application October 26, 1934, Serial No. 750,048

11 Claims. (Cl. 75—76)

This invention relates to a method of and apparatus for treating metal, particularly copper, including the treatment of the metal from a time prior to or during which it is molten until it has solidified, and has for an object the provision of improvements in this art.

This invention is an improvement upon certain inventions of the late David L. Summey. The Summey inventions are fully set forth in a series of pending applications, chief among which are Serial Number 535,829, filed May 8, 1931 for Process, and Serial Number 619,474, filed June 27, 1932 for apparatus. While enough of these inventions will be described herein to furnish an understanding of the present invention, the above-noted applications may be referred to for further details of the general development in which the present invention is set. In operations conducted according to the Summey inventions there was produced a metal which in point of freedom from oxygen and other contamination, freedom from porosity, and uniformity of high qualities was markedly superior to any similar metal theretofore known. There were a great many factors which contributed to this success. All of these factors were of critical importance and appear to have been fortuitously combined to produce the desired results. They are adequately disclosed in the said applications to enable one practicing the invention to obtain the desired results. Material variation of any one of these several factors was found to have serious effects on the quality of the product.

I have succeeded in determining the relative importance of these several factors and in reducing them to practical limits whereby the desired product can be produced with more exact control, thus permitting operation of the plant by less skilled operators; I have also succeeded in introducing certain new factors which have speeded up production and given a further marked improvement in the product.

The Summey invention, considered with reference to copper, for concrete illustration, comprised the following essential steps:

1. The provision of a supply of molten copper which was substantially free from the oxides of copper or substances which would produce oxides of copper, substantially free from the contamination of combustion fuel flames, substantially free from substances which would form objectionable porosity in the metal upon solidification, and substantially free from the harmful effects of deoxidizers such as phosphorus silicon, iron and the like.

2. The subsequent solidification of the metal into useful shapes while completely excluding undesired or uncontrolled substances from the metal.

The term "vertical" mold as used herein refers to a mold in which the depth is substantially greater than the smallest lateral dimension.

Supposing that cathode copper was taken as the raw material, the process was reduced to the simple expedient of melting and re-solidifying with positive protection against all undesired influences until the metal was again solid. The metal was protected from the air, until a time when it might be safely exposed, by means which positively excluded the air and preferably, for greater assurance, by means which was definitely deoxidizing in character. Such protecting means itself was required to be non-contaminating in its effect upon the metal. For a moderately quiet body of metal such as a pool or bath in a vessel it was disclosed that a deep bed of carbon would furnish ample protection because the oxygen of any air penetrating through the carbon would be combined before it reached the bath to form carbon monoxide which is harmless to the metal; for a moving body of metal, such as a flowing stream or cascade, where a covering of solid material could not expediently be maintained about the metal, it was disclosed that an inert or deoxidizing gas could be used to protect the metal if provision was made to keep the air from penetrating the envelope of protecting gas. This was effectively accomplished by providing a substantially complete structural enclosure for the flowing metal and the protecting gas envelope.

It was disclosed that the molds or other metal receiving instruments had to be thoroughly scavenged of air before metal was poured into them or the metal would be contaminated.

It was disclosed that the metal in the molds had to be protected until substantially solid, either by continuing the gas protection or by covering with a solid substance such as charcoal whereby to prevent exposure to air and contamination of the last-poured portions of the metal.

It was disclosed that the gas release was assisted by halting the metal during pouring in one or more shallow pools. In such cases heating means where provided to keep the metal from congealing, such means being of a suitable nature to avoid contaminating the purified metal.

I have discovered that when charcoal producer gas, which comprises carbon monoxide (CO), carbon dioxide ($CO_2$) and nitrogen (N), is used to protect copper it should contain over 10% CO and under 15% $CO_2$ and preferably 20% or more CO and 5% or less $CO_2$. Such a gas may be obtained from a producer operated at about 910° C. with a pure grade of wood charcoal. If the gas contains too much $CO_2$, $H_2$ or $H_2O$, the resulting castings will be unsound. The presence of excessive amounts of $CO_2$ is avoided by maintaining a deep bed of glowing charcoal in the producer and limiting the amount of air supplied to it. $H_2$ and $H_2O$ are substantially eliminated by drying the incoming air before it enters the producer. It may also be desirable under certain conditions to pass the protecting gas from the producer over a drying agent before supplying it to the hood and molds.

I have discovered that the pouring temperature for copper produced in the manner indicated above should not exceed 1140° C. Above this temperature the metal retains too much gas to permit of its being thoroughly released during solidification. The preferred temperature is 1125° C. or lower measured inside the pouring vessel adjacent the point of pouring. I have discovered that a more uniform stream may be fed from the bath by pouring through a funnel-like device into the intermediate shallow pool and thence into the mold. This produces a quieter and better regulated flow of metal into the pool and similarly improves the stream into the receiving device; it also provides an additional shallow pool for inducing the release of entrained or dissolved gases.

It has been found that only a shallow pool of molten metal may safely be permitted to exist in the molds during pouring if good castings are to be obtained. A deep body of molten metal tends to entrap gases and cause porosity. I have found that the rate of cooling or solidification in the molds is an extremely important element in the production of high quality castings. This rate is determined by the inter-relation of a number of different factors, among which are:

1. Temperature of pouring, which has already been discussed.
2. Rate of pouring.
3. The character of the mold dressing material.
4. The initial temperature of the molds.
5. The temperature and rate of circulation of the cooling fluid for the molds.
6. The thermal conductivity of the mold material.

I have found that the quality of cast copper shapes is improved, particularly with respect to density, by controlling the size of the pouring stream so that a mold is filled with metal at a rate of between 25 and 160 pounds per minute, preferably under 100 down to about 40 pounds a minute. Although the stream may be passably well controlled by varying its depth over the pouring lip of a ladle or other similar device, I prefer to limit its size positively by pouring through a hole of appropriate cross-sectional area. For example, to pour at the minimum speed of 25 pounds per minute, I use a ¼" diameter hole; to pour at the rate of 40 pounds per minute I use a $\frac{5}{16}$" diameter opening; and for the maximum speed of 160 pounds per minute a ½" diameter hole. Of course, the head of metal above the pouring hole has a bearing upon the rate, but I have found that relatively large variation in head (within inches) causes relatively small variation in the rate of flow of the stream compared to the effect of minute variations in the size of the stream itself such as usually occur in pouring over a lip.

In ordinary practice the rate of pouring is changed for shapes of different sizes but the preferred rate of under 100 down to about 40 pounds proves best for all billet sizes which have thus far been poured under my supervision, namely from 2½" diameter to 7½" diameter. While it could be made somewhat greater for square billets than for round billets, the given rate would produce sound billets in either shape. It was found that when a larger hole was used, say ¾" diameter for a greater pouring rate, the billets were apt to have cracks and faults in them.

The mold dressing which has been found satisfactory for casting copper treated according to the present process is a suspension of boneblack and bone-ash in water. There must be a certain thickness of material on the mold surfaces to keep the billets from sticking. Moreover, other conditions being the same, if the coating is too thin, the rate of cooling and solidification is too rapid to permit the escape of gases evolved during solidification and the resultant billets are porous. I have found that the specific gravity of the mold dressing must be kept between 12° and 22° Beaumé, preferably 15° to 20° Bé., to have the proper amount of suspended matter to produce a coating of the proper thickness. Below these limits gas holes are frequently found near the surface of the casting; above these limits the dressing tends to become rough and uneven which results in a corresponding lack of smoothness of the surface of the casting. The water of the mold dressing is thoroughly evaporated, for example by residual heat of the mold, before any metal is poured into the mold.

The initial temperature of the molds is kept between 190° and 240° F., preferably between 225° and 230° F., by means of a cooling fluid which is circulated rapidly enough to keep them within this range during pouring.

The thermal conductivity of the mold lining material is of considerable importance. Copper molds have given good results when used for casting tough pitch copper but when tried for the present type of oxygen-free copper did not prove satisfactory. I found that steel lined molds are satisfactory. Apparently the copper molds withdrew heat from the outer surfaces of the billet so rapidly that the interior portions did not have time to expel gases and become properly arranged. At any rate the castings made with copper molds were usually somewhat porous and unsatisfactory from a commercial sales standpoint, though they could be fabricated without harmful consequences; whereas consistently good castings of high density have been made with steel molds.

The metal is preferably cast into deep vertical molds since the metal therein has less exposed surface to be protected and the shape encourages gradual solidification of the metal from the bottom upward whereby gases and other impurities may be expelled as the metal solidifies. The metal must fall fairly into these molds, for if it strikes the sides it usually causes cracks and "cold sets" in the castings. Obviously the pouring hole must be aligned vertically and nicely centered over the molds for proper pouring; but I have found that the length of the hole greatly affects the cohesion of the pouring stream. Assuming a head of from 1 to 3 inches of copper above the hole and the preferred hole size of ⅜" to ¼" diameter to be used, the length of the pouring hole is preferably from 2 to 4 inches. If holes longer than 4 inches are used the metal tends to congeal in them; if shorter than 2 inches the metal tends to swirl and strike the sides of the mold.

Apparatus embodying and suitable for practicing the present invention is shown in the accompanying drawings, wherein.

Figure 1:
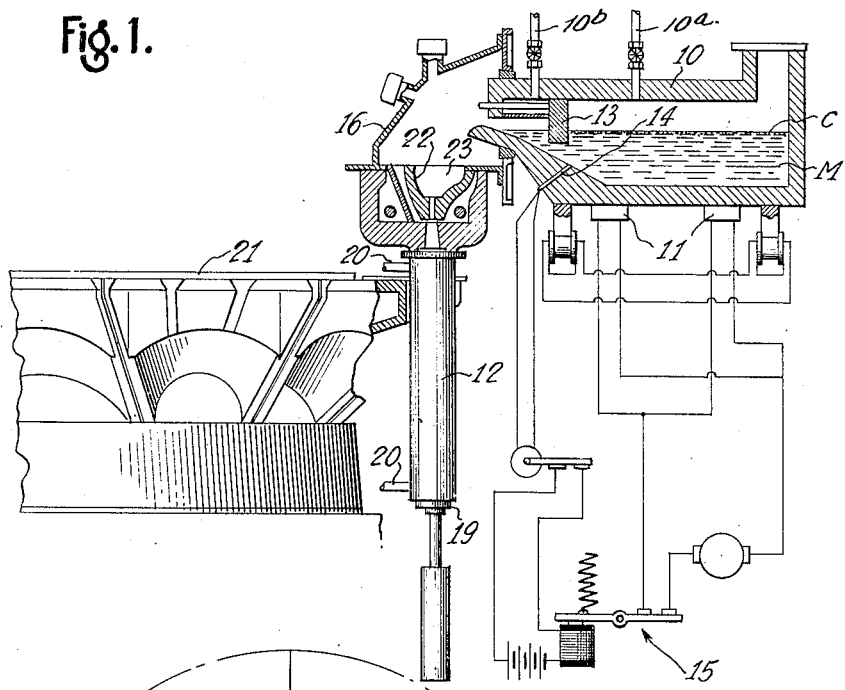
Fig. 1 is a schematic vertical section of a plant for treating and casting copper.

A bath of molten metal M is maintained in a pouring vessel 10. For simplicity it will be assumed that the metal is copper. It may be obtained by charging solid metal, for example copper cathodes, into the vessel if means are provided for heating the metal. Such heating means is herein illustrated in the form of electric induction heating units 11 arranged on each side of the vessel. Electrical heat is beneficial and preferred since it does not contaminate the metal in any way. Or, if desired, the metal may be charged in a molten condition into the pouring vessel, being obtained either from an electric furnace or from a fuel fired furnace if proper precautions are taken to free the metal or to keep it free from impurities other than oxygen. For example the metal received may be in an oxidized condition because the treatment is adapted to remove oxides; but it should not contain harmful amounts of other impurities because the treatment is not intended to remove them.

The metal in the pouring vessel is completely protected from the air. If the metal is free from oxygen it may be protected either by inert means or by means which is deoxidizing in its nature, preferably the latter since this will insure the removal of oxygen if it should inadvertently gain access. If the metal at the start contains oxygen, only the deoxidizing means may be used. A full enclosure for the vessel will keep out air but preferably the enclosure will contain an inert or deoxidizing agent. Herein a deep covering (about 12 inches) of a pure grade of carbon C is kept on the metal. This will alone exclude air from the metal because any air which enters the top surface of the carbon will be converted into harmless carbon monoxide before it reaches the metal. Even when carbon is used the full enclosure is beneficial because it prevents the too rapid consumption of carbon and assists in confining gas at superatmospheric pressure. The inert or deoxidizing agent such as a gas may be generated in the vessel or be introduced from outside as by regulable conduits 10a, 10b.

The metal is poured out of the pouring vessel so as finally to reach a solidifying device, here a mold 12, in the desired high state of purification. It is separated from the carbon covering by pouring from beneath it, the carbon being held back by a skimmer 13 or any other suitable means.

The metal should be poured at a very uniform temperature. This is secured by a pyrometer 14 immersed in the metal near the point of pouring and suitable mechanism 15 associated therewith for regulating the heat input to the vessel.

The preferred method of protecting the metal from the pouring vessel to the receiving device is to confine it within a structural enclosure or hood 16 in which is also confined a non-oxidizing gas at superatmospheric pressure. The preferred gas is one which is actually deoxidizing and which will burn in air with a visible flame. This furnishes greater certainty that the desired protection is being secured.

Figure 2:
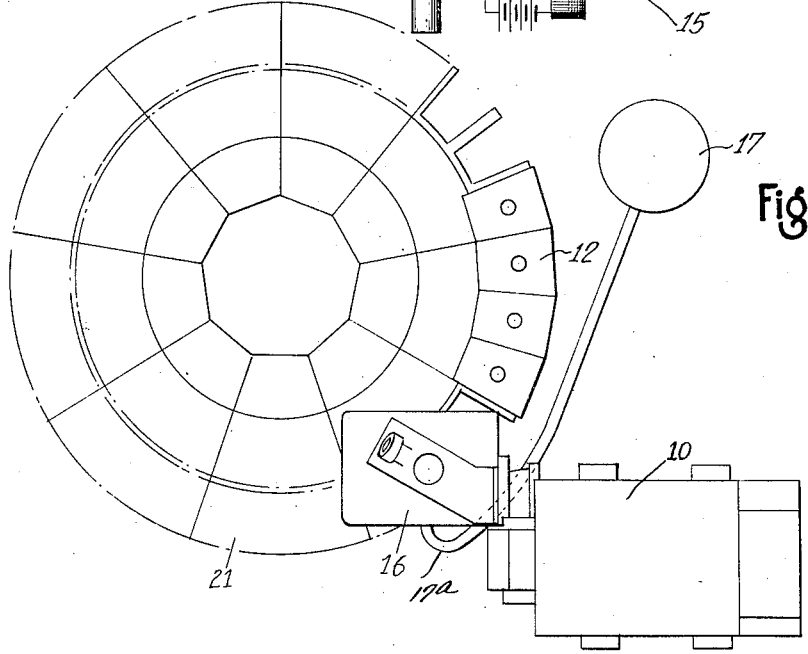
Fig. 2 is a plan view thereof.
Figure 3:
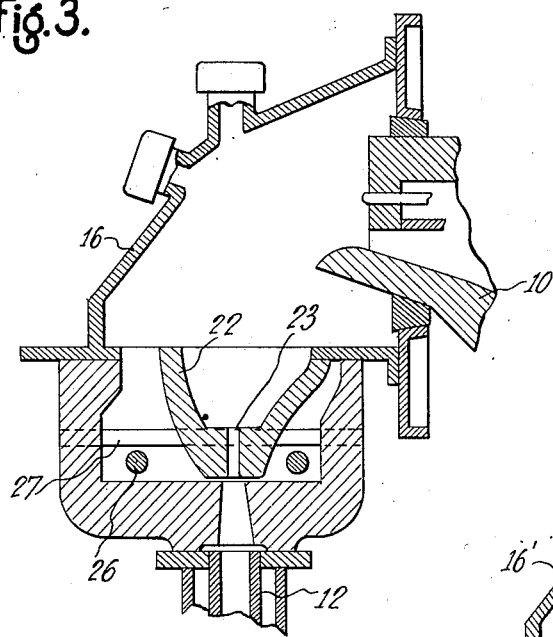
Fig. 3 is an enlarged section of mechanism for pouring the metal.

The gas may be supplied to the hood from a gas generator or producer 17 either by the pipe 10b shown in Fig. 1, or by a pipe connection 17a entering the hood at another point as shown in Fig. 2. The gas is supplied in excess so that when one of the series of molds 12 is halted beneath and connected with the hood the gas from the hood may flow through the mold when the closure 19 is open and burn at the bottom, thus indicating that the mold has been scavenged of all air.

The molds are cooled by suitable fluid supplied by pipes 20 carried by the wheel 21 on which the molds are mounted. The linings of the molds, as noted above, are preferably made of steel when oxygen-free copper of the present type is the metal being cast.

Figure 4:
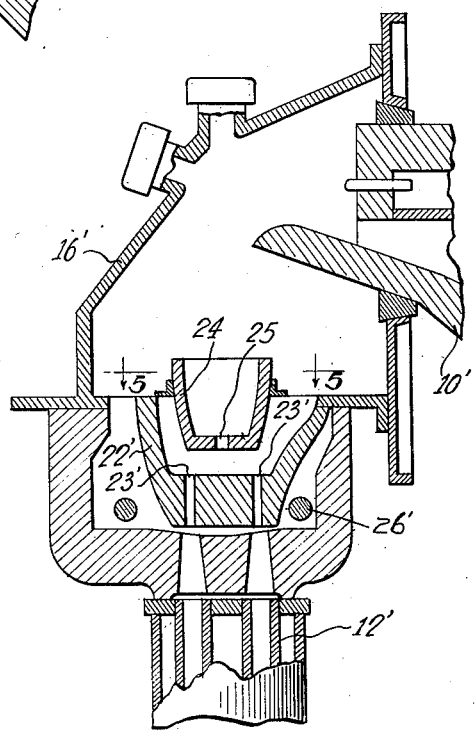
Fig. 4 is a similar section of apparatus for simultaneously pouring metal into a plurality of molds.
Figure 5:
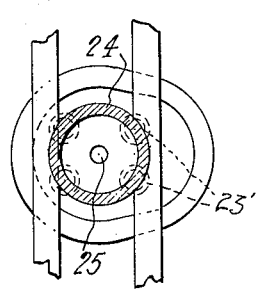
Fig. 5 is a horizontal section taken on the line 5—5 of Fig. 4.

The metal from the pouring furnace preferably is halted in a strainer 22 above the molds for the release of gases and for directing the metal into the molds. A head of from 1 to 3 inches of metal is kept in the strainer and this flows through a hole 23 in the bottom of the strainer. In some cases, especially when pouring several molds simultaneously as shown in Figs. 4 and 5, a funnel 24 is placed just above the strainer with its bottom opening 25 equidistant from the strainer holes and located about 1 inch above the bottom of the strainer. This provides another pool for the release of gases from the metal and serves to quiet the flow of the metal to the strainer holes whereby the flow of metal to the molds is made more steady or uniform.

If necessary or desired the metal at the strainer and spout is heated to keep it from solidifying as by electrical resistor heaters 26, 27.

After a filled mold leaves the region of the hood the metal in the mold if not yet solid is positively protected from the air. This may conveniently be done by covering it with carbon or some other suitable substance.

Before metal is poured into them the molds are coated with a suitable substance as described hereinabove.

The methods and means described herein are capable of producing cast metallic shapes of the highest quality. From the point of view of freedom from oxygen and other impurities, including solid residues of deoxidizing agents and reaction products thereof, the inventions of the late David L. Summey in process and apparatus have proved entirely adequate to produce a superior grade of metal. Also the castings made in accordance with those inventions were distinguished by the degree of mechanical perfection they attained. The present invention comprises improvements and refinements in operating methods, particularly with regard to features of control, of which the interrelation and relative importance have been pointed out in the foregoing description. Due to the practice of my invention the density of the cast shapes has been improved, external and internal flaws of every description have been even more completely eleminated, and the degree of uniformity with which these results are attained has reached the point where faulty production is almost unknown.

While this invention has been described in considerable detail for purposes of illustration it will be understood that it may have a broad scope within the spirit of the subjoined claims.

I claim:

1. The method of treating copper to secure castings of high density free from cuprous oxide, which comprises, maintaining molten copper in an electric furnace in the presence of carbon and securing adequate interaction therebetween to remove any oxide of the metal which may be present, coating a deep vertical steel mold with a coating material consisting of bone-black, bone-ash and water having a specific gravity of from 12° to 22° Beaumé and evaporating the water, pouring the metal from the furnace at a temperature below 1140° C. into a strainer within a structural enclosure filled under superatmospheric pressure with producer gas composed of carbon monoxide over 10%, carbon dioxide under 15%, the balance principally nitrogen, the gas being substantially free from water vapor and hydrogen, pouring the metal from the strainer into the mold at the rate of 25 to 160 pounds per minute, circulating water about the mold at a suitable temperature and volume to keep the mold within a temperature range of between 190° F. and 240° F., and positively protecting the metal from the air until solid.

2. The method of treating copper to secure castings of high density free from cuprous oxide, which comprises, melting cathode copper in an electric furnace in the presence of carbon, pouring the metal from the furnace at approximately 1125° C. into a strainer within a structural enclosure filled with producer gas composed of CO approximately 20% or more, $CO_2$ approximately 5% or less, the balance principally nitrogen, the gas being substantially free from water vapor and hydrogen, coating a deep vertical steel mold with a suspension of bone-black and bone-ash in water having a specific gravity of from 15° to 20° Beaumé and drying the coating, pouring the metal from the strainer into the mold at the rate of less than 100 pounds per minute, and circulating water about the mold at a temperature of from 225° F. to 235° F. in sufficient volume to keep the mold approximately within the same temperature range.

3. The method of treating copper to secure sound castings, which comprises maintaining a deep bed of carbon in contact with a bath of molten copper within a pouring vessel, pouring the metal from the vessel at approximately 1125° C. into a strainer while surrounding the stream with a body of producer gas composed of CO approximately 20% or more, $CO_2$ approximately 5% or less, the balance nitrogen, the gas being substantially free from water vapor and hydrogen, and pouring the metal from the strainer into a vertical water-cooled mold of a material having a low heat conductivity relative to copper at the rate of less than 100 pounds per minute.

4. The method of treating copper to produce sound castings, which comprises, melting the metal, preparing a mold by coating its interior surface with a preparation of bone-black and bone-ash in water having a specific gravity of from 12 to 22 degrees Beaumé, drying the coating material, and pouring and solidifying the metal in the mold.

5. The method of treating copper to produce sound castings, which comprises, melting the metal, preparing a water-cooled steel mold by coating its interior surface with a preparation of bone-black and bone-ash in water having a specific gravity of from 12 to 22 degrees Beaumé, drying the coating material, and pouring and solidifying the metal in the mold.

6. The method of pouring copper which has been subjected in the molten state under conditions of freedom from excessive contact with the harmful gases of fuel combustion to a sufficiently complete treatment with a harmless carbonaceous reducing agent to render the metal substantially free from cuprous oxide in order to obtain oxygen-free copper in solid form substantially free from internal and external flaws and of high density, which comprises, pouring the metal under conditions of freedom from excessive contact with air and harmful gases of fuel combustion, at a relatively low temperature into a pool of metal maintained under a head of from 1 to 3 inches over a tubular hole of uniform section of between ¼" and ½" diameter and a length of from 2 to 4 inches, and passing the metal from the pool into a vertical fluid-cooled mold having a low heat conductivity as compared to copper.

7. The method of pouring copper which has been subjected in the molten state under conditions of freedom from excessive contact with the harmful gases of fuel combustion to a sufficiently complete treatment with a harmless carbonaceous reducing agent to render the metal substantially free from cuprous oxide in order to obtain oxygen-free copper in solid form substantially free from internal and external flaws and of high density, which comprises, pouring the metal under conditions of freedom from excessive contact with air and harmful gases of fuel combustion, at a temperature below 1140° C. and at a pouring rate of from 25 to 160 pounds per minute into a vertical mold which abstracts heat from the metal at a low rate compared to copper.

8. The method of pouring copper which has been subjected in the molten state under conditions of freedom from excessive contact with the harmful gases of fuel combustion to a sufficiently complete treatment with a harmless carbonaceous reducing agent to render the metal substantially free from cuprous oxide in order to obtain oxygen-free copper in solid form substantially free from internal and external flaws and of high density, which comprises, pouring the metal under conditions of freedom from excessive contact with air and harmful gases of fuel combustion, at a temperature of approximately 1125° C. and a pouring rate of less than 100 pounds per minute into a vertical fluid-cooled mold of a material having a low heat conductivity as compared to copper.

9. The method of pouring copper which has been subjected in the molten state under conditions of freedom from excessive contact with the harmful gases of fuel combustion to a sufficiently complete treatment with a harmless carbonaceous reducing agent to render the metal substantially free from cuprous oxide in order to obtain oxygen-free copper in solid form substantially free from internal and external flaws and of high density, which comprises, pouring the metal under conditions of freedom from excessive contact with air and harmful gases of fuel combustion, at a temperature below 1140° C. into a shallow pool of metal maintained over a tubular hole of such shape and length that the metal will not swirl, and passing the metal from the pool through the hole at a pouring rate of from 25 to 160 pounds per minute into a vertical fluid-cooled mold which abstracts heat from the metal at a low rate compared to copper.

10. The method of pouring copper which has been subjected in the molten state under conditions of freedom from excessive contact with the harmful gases of fuel combustion to a sufficiently complete treatment with a harmless carbonaceous reducing agent to render the metal substantially free from cuprous oxide in order to obtain oxygen-free copper in solid form substantially free from internal and external flaws and of high density, which comprises, pouring the metal under conditions of freedom from excessive contact with air and harmful gases of fuel combustion, at a temperature below 1140° C. into vertical fluid-cooled steel molds and there solidifying the metal progressively from the bottom upward while maintaining a relatively shallow pool of unsolidified metal in the mold.

11. The method of pouring copper which has been subjected in the molten state under conditions of freedom from excessive contact with the harmful gases of fuel combustion to a sufficiently complete treatment with a harmless carbonaceous reducing agent to render the metal substantially free from cuprous oxide in order to obtain oxygen-free copper in solid form substantially free from internal and external flaws and of high density, which comprises, pouring the metal under conditions of freedom from excessive contact with air and harmful gases of fuel combustion at a relatively low temperature and at a rate of between 25 and 160 pounds per minute into vertical fluid-cooled molds having a relatively low heat conductivity compared to copper.

LUTHER W. BAHNEY.